(12) United States Patent
Fan et al.

(10) Patent No.: US 8,305,548 B2
(45) Date of Patent: Nov. 6, 2012

(54) SYSTEM FOR DISPLAYING IMAGES AND MANUFACTURING METHOD OF THE SAME

(75) Inventors: Shang-Chin Fan, Hsinchu County (TW); Hao-Ming Chang, Hsinchu (TW); Dai-Liang Ting, Hsinchu (TW)

(73) Assignee: Chimei Innolux Corporation (TW)

( * ) Notice: Subject to any disclaimer, the term of this patent is extended or adjusted under 35 U.S.C. 154(b) by 412 days.

(21) Appl. No.: 12/543,639

(22) Filed: Aug. 19, 2009

(65) Prior Publication Data

US 2010/0053533 A1   Mar. 4, 2010

(30) Foreign Application Priority Data

Aug. 27, 2008  (TW) .............................. 97132672 A

(51) Int. Cl.
  *G02F 1/13* (2006.01)
(52) U.S. Cl. ....................................................... 349/187
(58) Field of Classification Search .................... 349/187
  See application file for complete search history.

(56) References Cited

U.S. PATENT DOCUMENTS

| | | | |
|---|---|---|---|
| 7,019,800 B2 | 3/2006 | Kuo | |
| 7,038,751 B2 | 5/2006 | Lee | |
| 7,061,571 B2 | 6/2006 | Liu et al. | |

FOREIGN PATENT DOCUMENTS

| | | |
|---|---|---|
| CN | 1472572 | 2/2004 |
| CN | 1713056 | 12/2005 |

OTHER PUBLICATIONS

Office Action issued Jan. 11, 2012 from corresponding application No. CN 200810146638.0.

*Primary Examiner* — Phu Vu
(74) *Attorney, Agent, or Firm* — Lowe Hauptman Ham & Berner, LLP

(57) ABSTRACT

A system for displaying images and manufacturing method of the same are provided. The system for displaying images includes a liquid crystal display panel. The liquid crystal display panel includes a first substrate having a circuit pattern thereon. A second substrate is disposed to oppositely face the first substrate. A liquid crystal layer is sandwiched between the first and second substrates. A sealant is between the first and second substrates and adjacent to the liquid crystal layer. The circuit pattern has at least one light-transmitting area corresponding to the boundary between the sealant and the liquid crystal layer thereby allowing a light to irradiate the sealant.

17 Claims, 8 Drawing Sheets

SYSTEM FOR DISPLAYING IMAGES AND MANUFACTURING METHOD OF THE SAME

CROSS REFERENCE TO RELATED APPLICATIONS

This application claims priority of Taiwan Patent Application No. 097132672, filed on Aug. 27, 2008, the entirety of which is incorporated by reference herein.

BACKGROUND

1. Field

The present invention relates to a system for displaying images and manufacturing method of the same, and in particular, to a circuit pattern design in a position corresponding to an interface between a liquid crystal layer and a sealant of a liquid crystal display.

2. Description of the Related Art

Recently, liquid crystal displays have been applied widely to the display element of various products. One-drop fill technique is now mainly used in assembling liquid crystal displays to improve throughput. However, in the conventional one-drop fill technique, liquid crystals at an interface between the liquid crystal and a sealant may be contaminated or have permeated problems due to the sealant contacting the liquid crystal before the sealant is cured. Specifically, in the conventional process, a position where the sealant is dispensed, may be shielded by a thin film transistor circuit substrate or by black matrix (BM) layers. The technique reduces an effective area of the sealant irradiated by an ultra-violet (UV) light. Therefore, the liquid crystal and a sealant may be contaminated or have permeated problems due to the sealant contacting the liquid crystal before the sealant is cured. The aforementioned problems may worsen when fabricating medium and small sized panels.

Various methods for curing a sealant have been developed. U.S. Pat. No. 7,061,571 B2 disclosed a conventional method for curing a sealant as shown in FIG. 1. A sealant 308 adjacent to a liquid crystal layer 306 is cured by a UV light 312b irradiating from the outside of the thin film transistor substrate 302 and a color filter substrate 304 or from the sides of the thin film transistor substrate 302 and a color filter substrate 304 with an angle $\theta_b$, respectively. A position of the sealant 308, however, is shielded by circuits of the thin film transistor substrate 302 or by black matrix (BM) layers of the color filter substrate 304, thereby shielding UV light from irradiating and curing the sealant 308. Therefore, performance of curing the sealant 308 is not optimal.

U.S. Pat. No. 7,019,800 B2 disclosed another conventional method for curing a sealant as shown in FIG. 2. A sealant 208 at and adjacent to an interface 216 between a liquid crystal layer 206 and the sealant 208 is cured by a UV light irradiating from a light-transmitting area 303 of a BM layer 210. The area of the light-transmitting area 303 of the BM layer 210, however, cannot be increased without limitation to prevent the liquid crystal display from light leakage problems. Therefore, an effective area of the sealant irradiated by UV light is limited. Additionally, the conventional BM layer is formed of organic materials and is sensitive to the UV light. The conventional BM layer may suffer from material decomposition problems, thereby resulting in light leakage and poor substrate adhesion.

U.S. Pat. No. 7,038,751 B2 disclosed yet another conventional method for curing a sealant as shown in FIG. 3. Additional process fabrication steps for the thin film transistor substrate 11 are needed. Several metal barrier layers 16 are added in a display region of the panel, thereby reducing a liquid crystal 18 from contacting a surrounding sealant 19. The metal barrier layers 16, however, may increase fabrication complexity and fabrication costs. Additionally, if a dispensed position of the sealant 19 cannot be located right on the outside of the metal barrier layers 16, the sealant 19 would overflow into the panel and contaminate the liquid crystal 18.

Therefore, a system for displaying images and manufacturing method of the same with improved curing performances, thereby reducing the contamination problem of the liquid crystal by the uncured sealant is needed.

SUMMARY

To solve the above-described problems, a method for fabricating a semiconductor device is provided. An exemplary embodiment of a method for fabricating a semiconductor device comprises.

An exemplary embodiment of a system for displaying images comprises a liquid crystal display panel comprising a first substrate having a circuit pattern thereon. A second substrate is disposed to oppositely face the first substrate. A liquid crystal layer is sandwiched between the first and second substrates. A sealant is between the first and second substrates and adjacent to the liquid crystal layer, wherein the circuit pattern has at least one first light-transmitting area corresponding to a boundary between the sealant and the liquid crystal layer thereby allowing a light to irradiate the sealant.

An exemplary embodiment of a method for fabricating a system for displaying images comprises providing a first substrate and a second substrate, wherein the first substrate has a circuit pattern thereon. A sealant is dispensed around and on the second substrate, thereby forming an enclosed region on the second substrate. An amount of liquid crystal is dropped in the enclosed region on the second substrate, thereby allowing the liquid crystal to contact the sealant. The first and second substrates are assembled, wherein the circuit pattern has at least one first light-transmitting area corresponding to a boundary between the sealant and the liquid crystal layer. A light irradiates the first substrate, wherein the light irradiates the sealant through the first light-transmitting area to cure the sealant.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4b shows a cross section along line A-A' of FIG. 4a.

DETAILED DESCRIPTION

Figure 1:
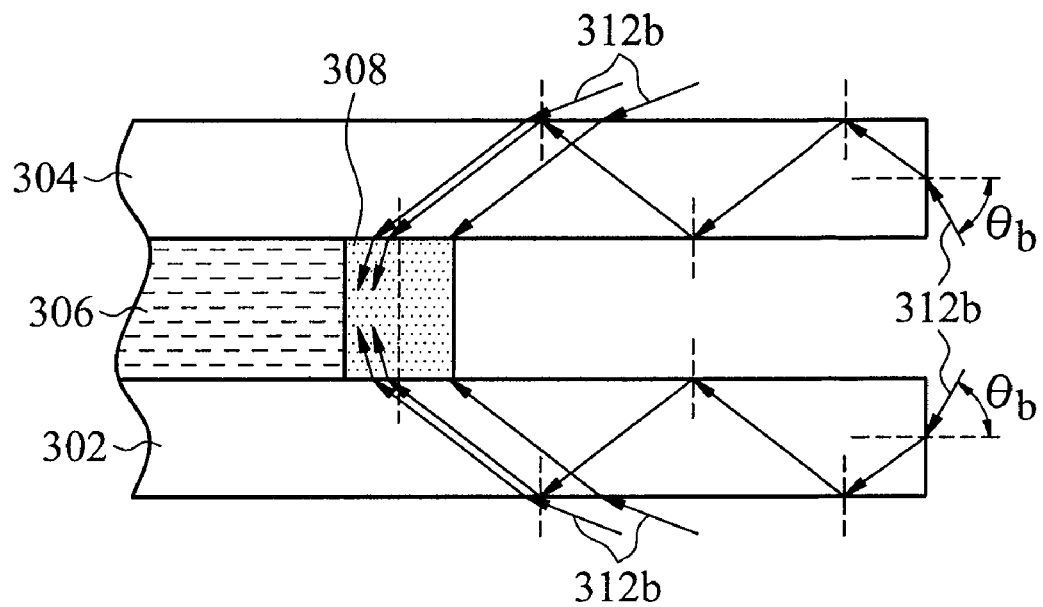
FIGS. 1 to 3 show conventional methods for curing a sealant.
Figure 2:
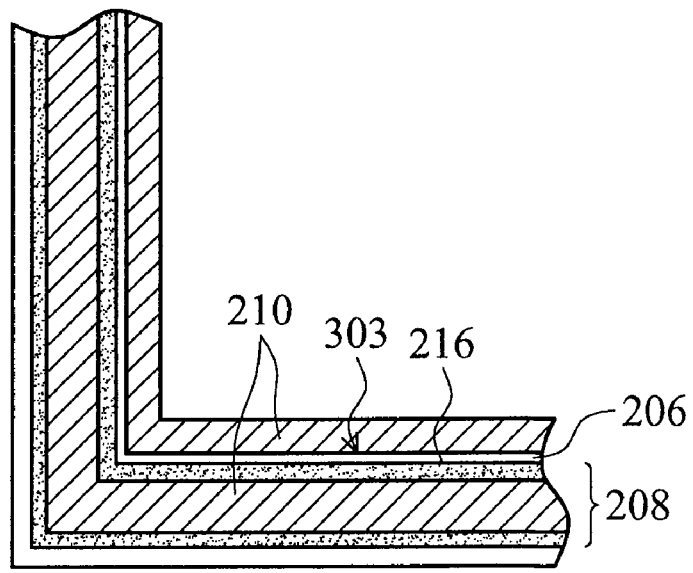
Figure 3:
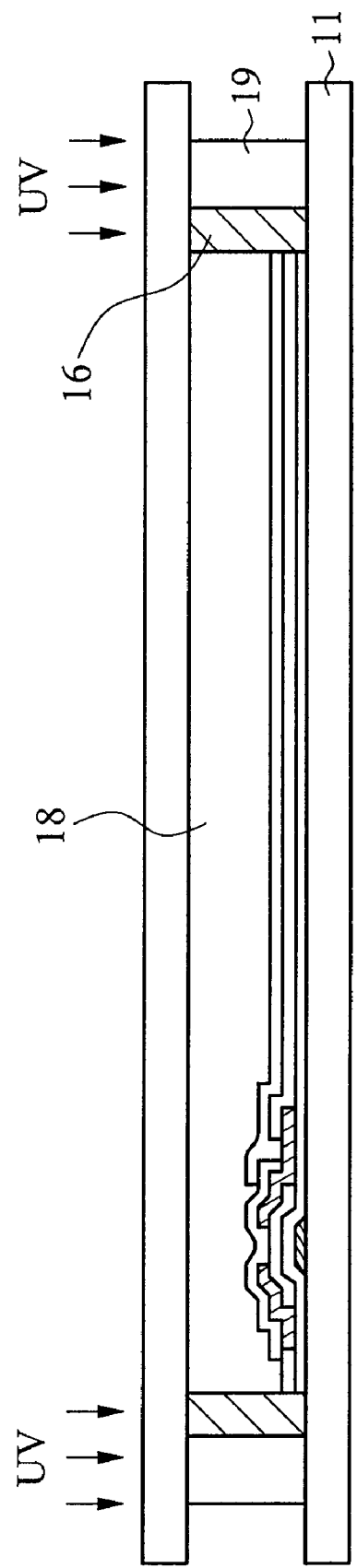

The following description is of a mode for carrying out the invention. This description is made for the purpose of illustrating the general principles of the invention and should not be taken in a limiting sense. The scope of the invention is best determined by reference to the appended claims. Wherever possible, the same reference numbers are used in the drawings and the descriptions to refer the same or like parts.

The present invention will be described with respect to particular embodiments and with reference to certain drawings, but the invention is not limited thereto but is only limited by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Figure 4A:
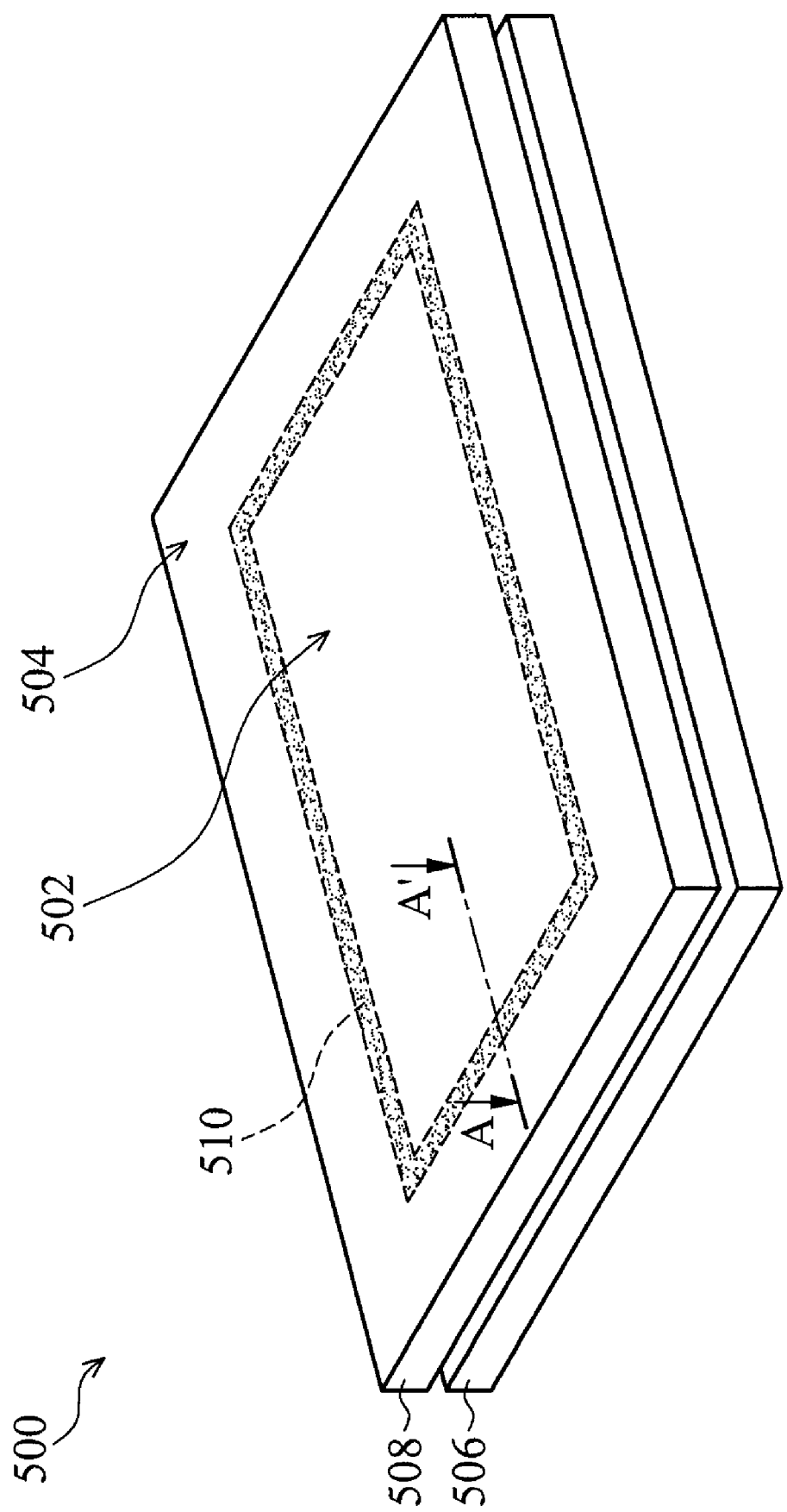
FIG. 4a is a top view illustrating one exemplary embodiment of a system for displaying images of the invention.
Figure 4B:
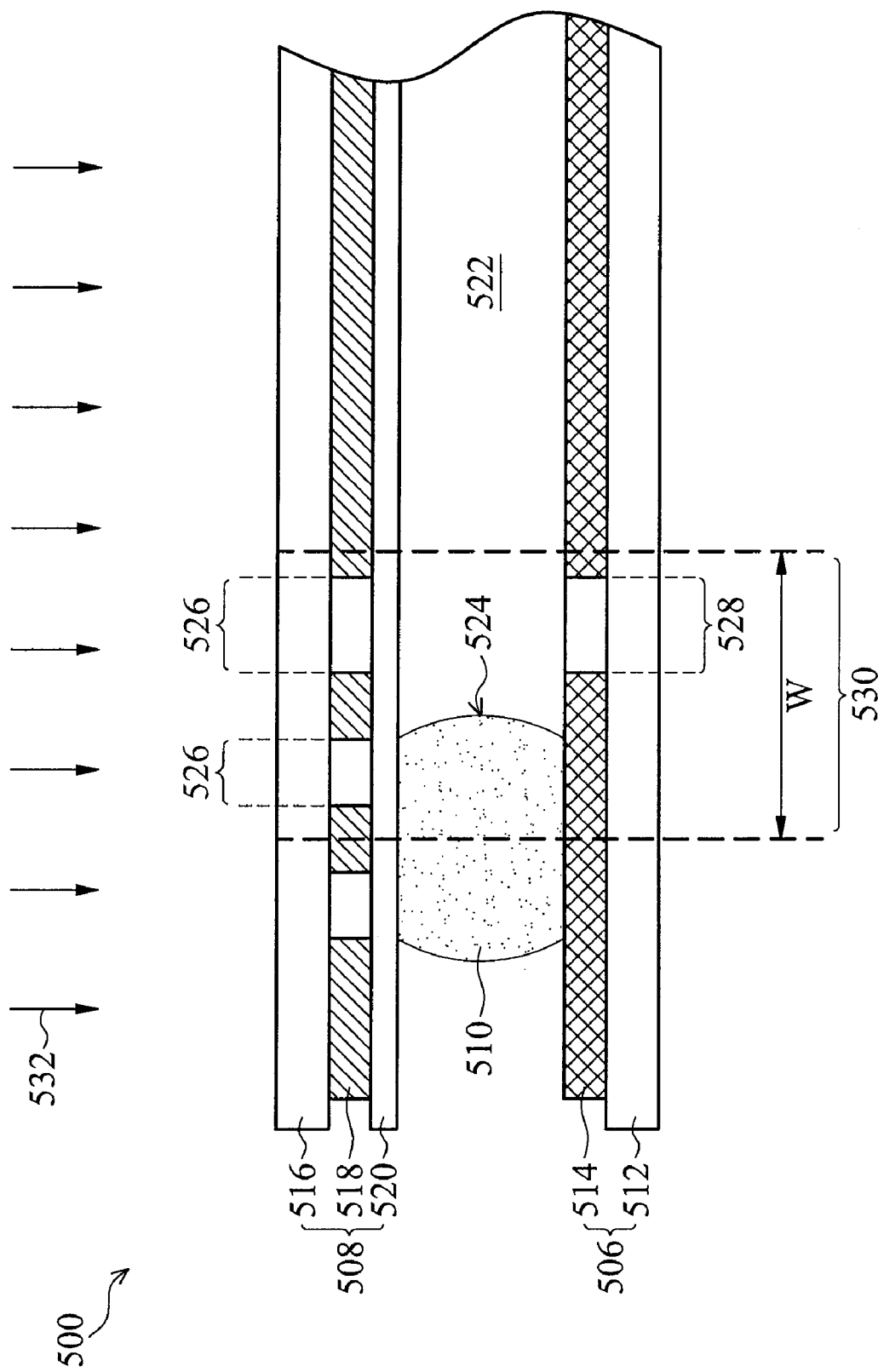

FIG. 4a is a top view illustrating one exemplary embodiment of a system for displaying images of the invention. FIG. 4b shows a cross section view along line A-A' of FIG. 4a. One exemplary embodiment of a system for displaying images may comprise a liquid crystal display (LCD) panel 500 having a display region 502 and a periphery circuit region 504 surrounding the display region 502. The liquid crystal display (LCD) panel 500 may comprise a first substrate 508 and an oppositely disposed second substrate 506. In one embodiment, the first substrate 508 may be a thin film transistor substrate of the liquid crystal display (LCD) panel 500. The first substrate 508 may comprise a glass substrate 516, a circuit pattern 518 on the glass substrate 516 and an insulating layer 520 covering the circuit pattern 518, wherein the circuit pattern 518 has at least one first light-transmitting area 526. The second substrate 506 may be a color filter substrate of the liquid crystal display (LCD) panel 500. The second substrate 506 may comprise a glass substrate 512 and a light shielding layer (also referred to as black matrix (BM) layer) 514 on the glass substrate 512, wherein the light shielding layer 514 has at least one second light-transmitting area 528. Generally speaking, the light shielding layer 514 is used to block an undesired display portion of the liquid crystal display (LCD) panel 500, for example, signal routings for transparent electrodes (ITO) (not shown), signal routings for and source driver chips of sub-pixels, and thin film transistors or storage capacitors, thereby not disturbing accurate brightness of the display region. In one embodiment, the circuit pattern 518 may comprise conductive lines, capacitors, resistors, inductances, transistors or other electronic devices. The circuit pattern 518 may comprise metal materials, for example, Al or Mo. As shown in FIGS. 4a and 4b, the liquid crystal display (LCD) panel 500 may comprise a liquid crystal (LC) layer 522 between the first substrate 508 and the second substrate 506. A sealant 510 is disposed between the first substrate 508 and the second substrate 506 and adjacent to the outside of the liquid crystal layer 522. The sealant 510 is disposed surrounding the LC layer 522, thereby framing and limiting the LC layer 522 inside the LCD panel 500. The sealant 510 is used to assemble the first substrate 508 and the second substrate 506 and to isolate the LC layer 522 from the atmosphere.

As shown in FIG. 4b, the circuit pattern 518 of the first substrate 508 may have a plurality of first light-transmitting areas 526 corresponding to an interface 524 between the sealant 510 and the LC layer 522, thereby allowing a light 532, for example, an ultra-violet (UV) light, to irradiate the sealant 510 at and adjacent to the interface 524 through the first light-transmitting areas 526 of the circuit pattern 518. In one embodiment, the sealant 510 may comprise a light and thermal cured sealant. Therefore, when the light 532 irradiates the sealant 510, the whole sealant 510 can be cured immediately such that the LC layer 522 is prevented from contamination by the uncured sealant 510.

Additionally, in one embodiment, a boundary 530 between the sealant 510 and the LC layer 522 may extend from the interface 524 between the sealant 510 and the LC layer 522 into a portion of the sealant 510 and the LC layer 522, respectively. In one embodiment, a width of the boundary 530 may be about 300 µm to 600 µm. And the interface 524 is positioned substantially in the middle of the boundary 530 between the sealant 510 and the LC layer 522.

Moreover, the sealant 510 is generally disposed on a position corresponding to the periphery circuit region 504 with lower circuit density. Therefore, the circuit pattern 518 can be disposed to avoid a position corresponding to the boundary 530 between the sealant 510 and the LC layer 522. Additionally, the first light-transmitting areas 526 corresponding to the boundary 530 may have an increased area and an area of the sealant 510 irradiated by the light 532 can be increased. In one embodiment, an area ratio of the first light-transmitting areas 526 of the circuit pattern 518 to the boundary 530 may be about 10% to 100%. When the light 532 irradiates the first substrate 508, the light 532 may also irradiate the sealant 510 through the first light-transmitting areas 526 without being substantially shielded by the circuit pattern 518. Therefore, the sealant 510 corresponding to the boundary 530 may have enough light irradiation by the light 532, to ensure curing of the sealant 510 adjacent to the LC layer 522. The conventional contamination problem of the LC layer 522 by the uncured sealant 510 can thus be reduced.

Additionally, in one embodiment, the light shielding layer 514 of the second substrate 506 may have at least one second light-transmitting area 528 corresponding to the boundary 530, and an area ratio of the second light-transmitting area 528 to the boundary 530 may be about 0.1% to 10%. Therefore, the light 532 may illuminate outward through the second light-transmitting area 528 while the light 532 also irradiates through the first light-transmitting areas 526. The conventional material decomposition problem of the light shielding layer 514 during curing of the sealant 510 by the light 532 can thus be avoided.

Figure 5A:
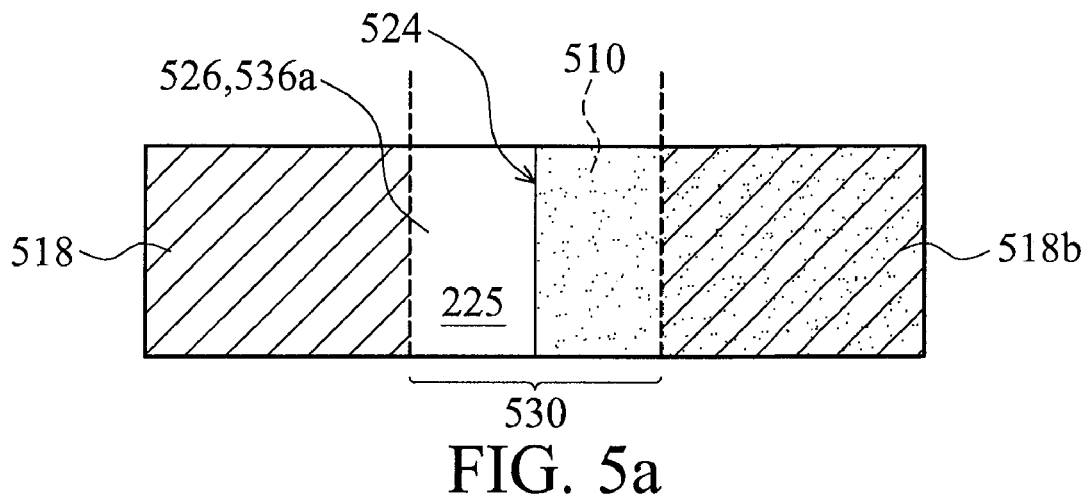
FIGS. 5a to 5e are schematic views illustrating one exemplary embodiment of exposure opening of a first light-transmitting area corresponding to a boundary of the invention.
Figure 5B:
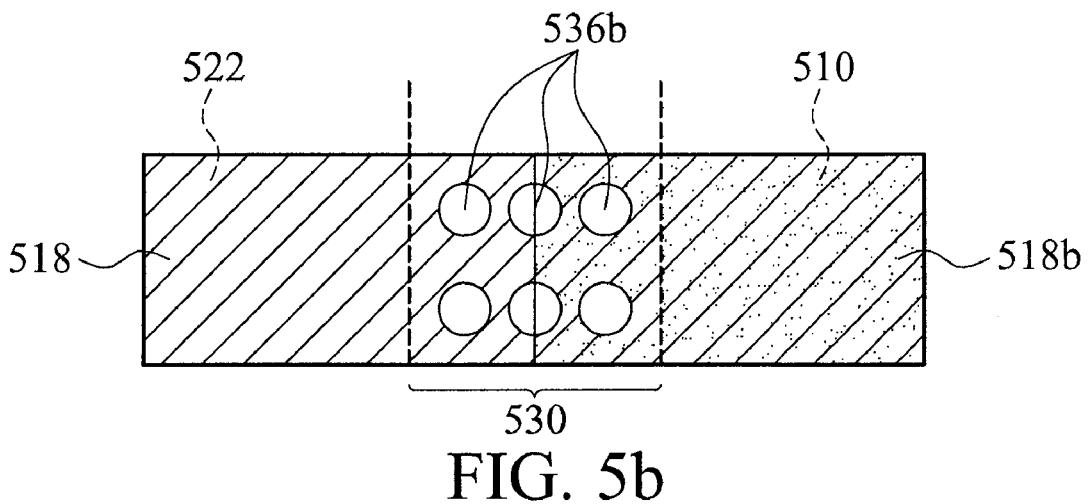
Figure 5C:
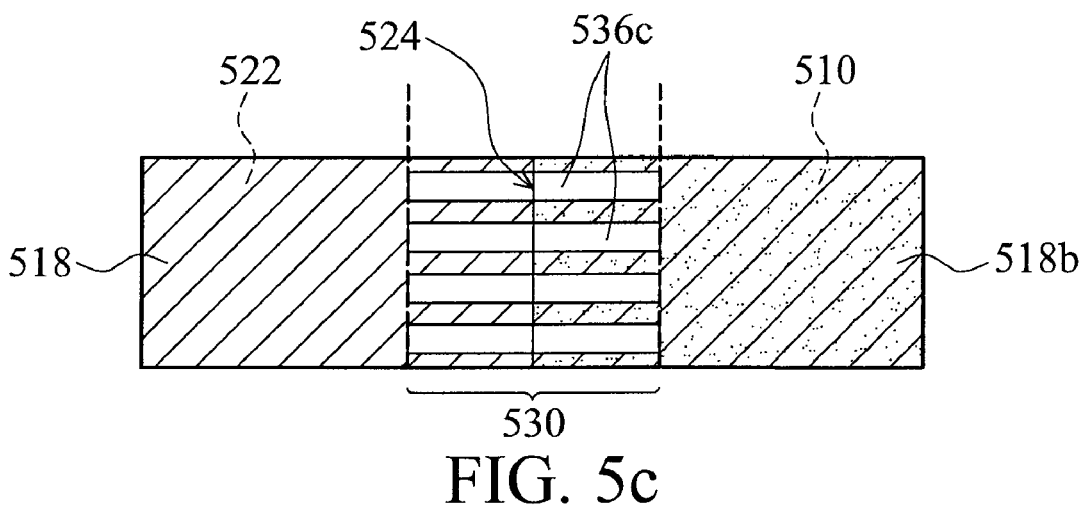
Figure 5D:
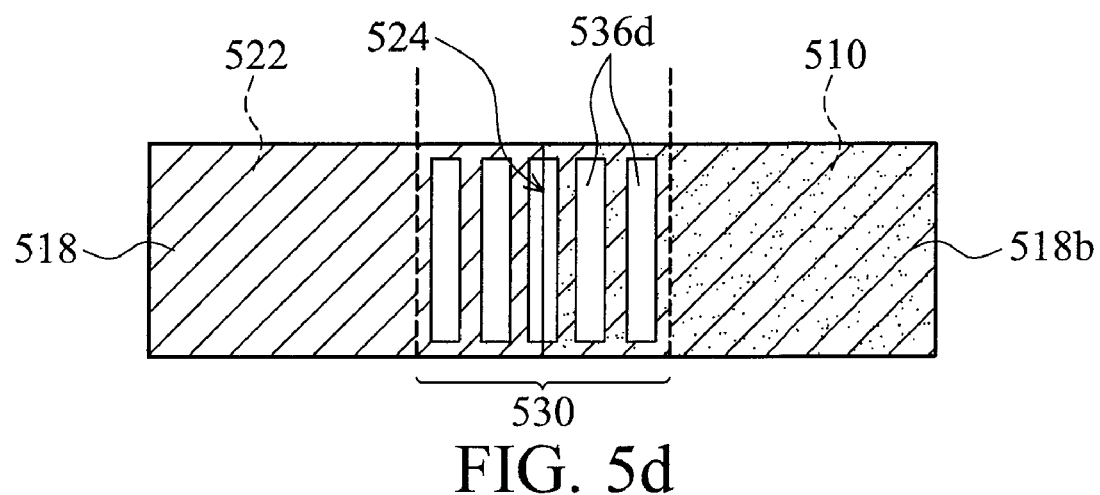
Figure 5E:
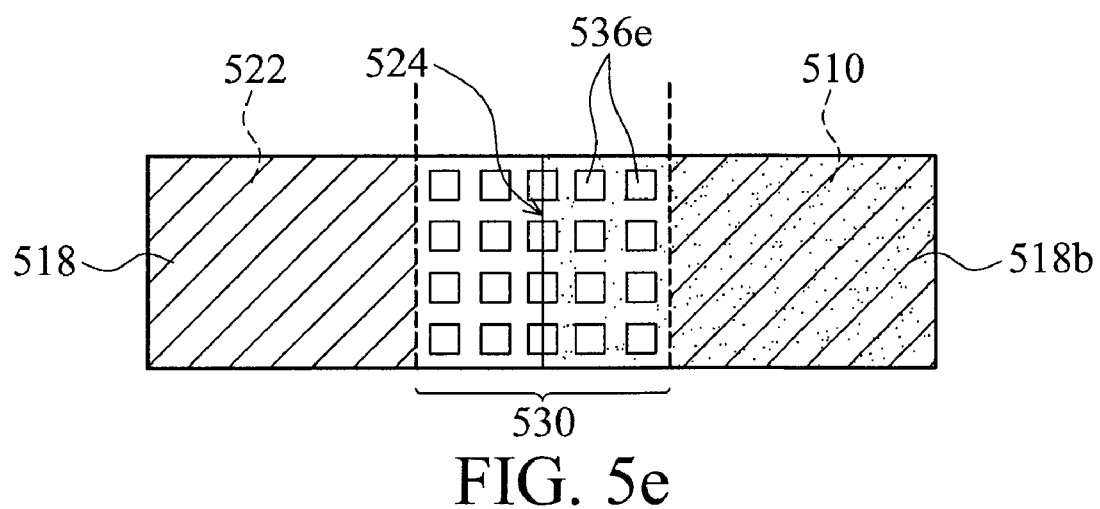

FIGS. 5a to 5e are schematic views illustrating one exemplary embodiment of an exposure opening corresponding to a first light-transmitting area 526 of the boundary 532 of the invention. As shown in FIGS. 5a to 5e, the first light-transmitting area 526 may be composed of at least one exposure opening. The exposure opening may have a shape comprising a circular shape, elliptic shape, polygonal shape or combinations thereof, but are not limited to the disclosure herein. For example, as shown in FIG. 5a, the exposure opening 536a of the circuit pattern 518 may be an opening having a width the same as that of the boundary 530. As shown in FIG. 5b, the exposure openings 536b of the circuit pattern 518 may be a plurality of circular openings. As shown in FIG. 5c, the exposure openings 536c of the circuit pattern 518 may be a plurality of strip shaped openings perpendicular to the interface 524. As shown in FIG. 5d, the exposure openings 536d of the circuit pattern 518 may be a plurality of strip shaped openings parallel to the interface 524. As shown in FIG. 5e, the exposure openings 536e of the circuit pattern 518 may be a plurality of rectangular shaped openings. Additionally, arrangements of the exposure openings 536a to 536e are according to design, but are not limited to the disclosure herein. In one embodiment, the exposure openings may be arranged as an array as shown in FIG. 5e. Also, the exposure openings may be arranged in an arbitrary arrangement. It is only noted that the interface 524 between the sealant 510 and the LC layer 522 must be exposed from the exposure openings, thereby improving light irradiation of the sealant 510 at and adjacent to the interface 524.

Figure 6:
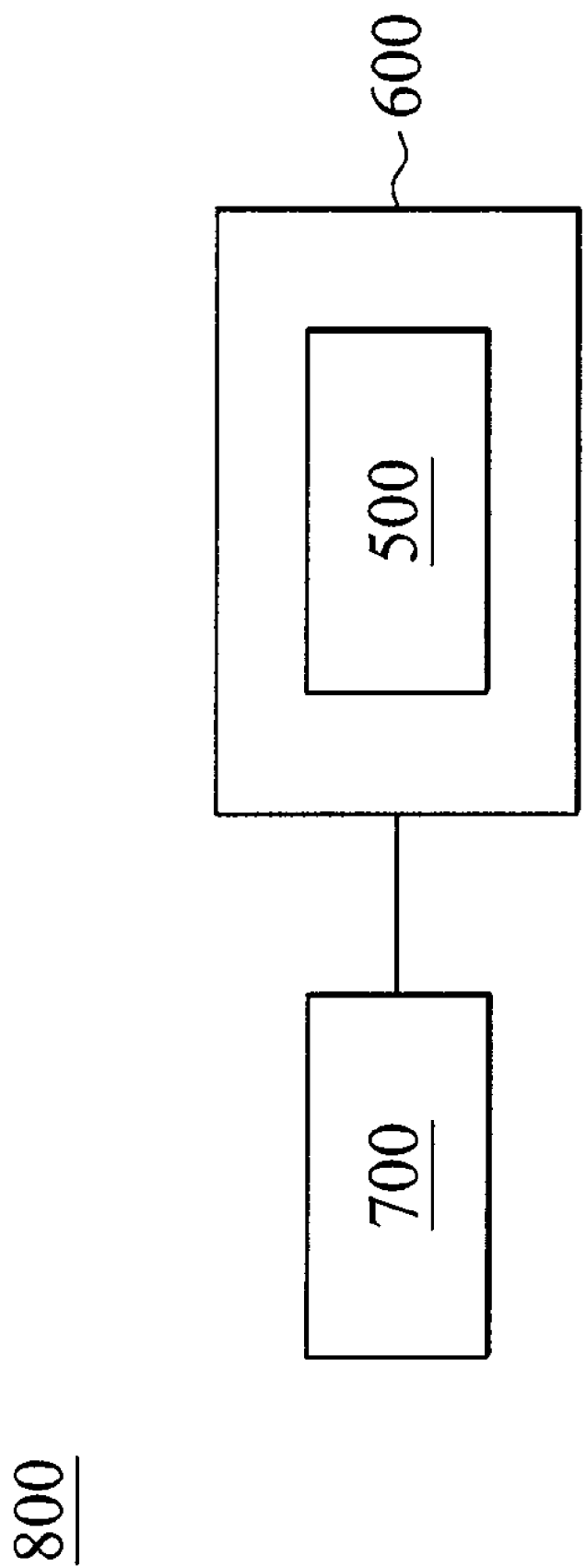
FIG. 6 schematically shows a system for displaying images including the liquid crystal display panel according to embodiments of the invention.

Referring to FIG. 6, FIG. 6 shows a system 800 for displaying images including the liquid crystal display panel 500 according to embodiments of the invention. The system 800 comprises a liquid crystal display 600, and the liquid crystal display 600 comprises the liquid crystal display panel 500 according to the embodiments of the invention, a pair of polarizers sandwiching the liquid crystal display panel 500, and a backlight device disposed under the lower polarizer. The liquid crystal display 600 can be a part of an electronic device. In general, the system 800 for displaying images comprises the liquid crystal display 600 and an input unit 700. The input unit 700 is coupled to the liquid crystal display 600 and operative to provide input to the liquid crystal display such that the liquid crystal display displays images. The liquid crystal display 600 according to the embodiments of the invention may comprise twisted nematic (TN) liquid crystal displays, super twisted nematic (STN) liquid crystal displays, multi-domain vertical alignment (MVA) liquid crystal displays, in-plane switching (IPS) liquid crystal displays, fringe field switching (FFS) liquid crystal displays and other liquid crystal displays. The system 800 for displaying images can be a mobile phone, digital camera, personal digital assistant (PDA), notebook computer, desktop computer, television, car display or portable DVD player.

Figure 7:
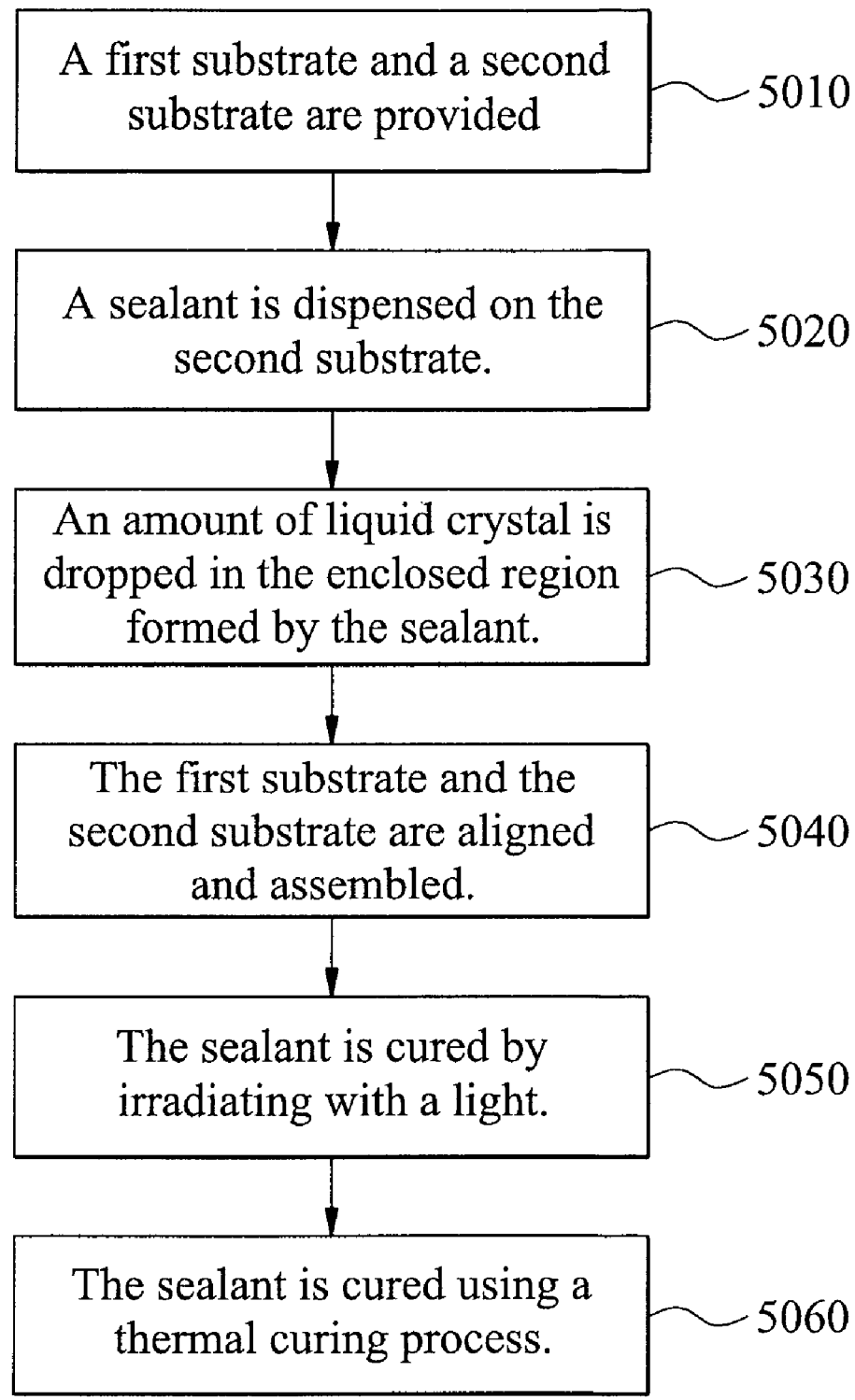
FIG. 7 is a flow diagram showing a fabricating process of a system for displaying images of the invention.

FIG. 7 is a flow diagram showing a fabricating process of a system for displaying images of the invention. The flow diagram as shown in FIG. 7 illustrates a liquid crystal display panel 500 of a system for displaying images fabricated by a one drop filling (ODF) process, but is not limited to the disclosure herein. As shown in step 5010, the step of fabricating the liquid crystal display panel 500 comprises providing a first substrate (for example, a thin film transistor substrate having circuit patterns thereon) and a second substrate (for example, a color filter substrate). As shown in step 5020, a sealant is then dispensed around and on the second substrate, thereby forming an enclosed region on the second substrate. As shown in step 5030, an amount of liquid crystal is dropped in the enclosed region on the second substrate, thereby allowing the liquid crystal to contact with the sealant. As shown in step 5040, the first and second substrates are aligned using photo-alignment methods in a vacuum atmosphere. Next, the first and second substrates are assembled by, for example, a jig pressing or hot pressing process, wherein the circuit pattern of the first substrate has at least one first light-transmitting area corresponding to a boundary between the sealant and the liquid crystal layer. As shown in step 5050, a light, for example, a UV light, is used to irradiate the sealant through the first light-transmitting area of the first substrate to cure the sealant in a position corresponding to the boundary. As shown in step 5060, the whole sealant between the first and second substrates is cured using a thermal curing process. Alternatively, the liquid crystal display panel 500 may be fabricated by assembling the first and second substrates first. The sealant may be then cured. Finally, the liquid crystal display panel 500 may be completely formed by injecting the liquid crystal into the liquid crystal display panel 500.

In one embodiment, an area ratio of the first light-transmitting areas of the circuit pattern on the first substrate (for example, thin film transistor substrate), which is corresponding to the boundary, to the boundary may be designed to be about 10% to 100%. Therefore, the light, for example, UV light, may be allowed to irradiate the sealant through the first light-transmitting areas without being substantially shielded by the circuit pattern, thereby ensuring the curing of the sealant on an interface between the sealant and the LC layer. The conventional contaminated problem of the LC layer by the uncured sealant is thus avoided. Also, an area ratio of the second light-transmitting area, which is corresponding to the boundary, to the boundary may be designed to be about 0.1% to 10%. Therefore, the light, for example, a UV light, may be illuminated outward through the second light-transmitting area while the light also irradiates through the first light-transmitting areas. The conventional material decomposition problem of the light shielding layer during curing of the sealant by irradiating the light can thus also be avoided.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
   a liquid crystal display panel, comprising:
   a first substrate having a circuit pattern thereon;
   a second substrate disposed to oppositely face the first substrate;
   a liquid crystal layer sandwiched between the first and second substrates; and
   a sealant between the first and second substrates and adjacent to the liquid crystal layer, wherein the circuit pattern has at least one first light-transmitting area corresponding to a boundary between the sealant and the liquid crystal layer thereby allowing a light entering the liquid crystal display panel from the first substrate through the first light-transmitting area to irradiate the sealant, wherein the second substrate further comprises a light shielding layer thereon, the light shielding layer has at least one second light-transmitting area corresponding to the boundary, and an area ratio of the second light-transmitting area to the boundary is 0.1% to 10%, and the second light-transmitting area overlaps with the first light-transmitting area from a top view, so that the light illuminates outward through the second light-transmitting area while the light also irradiates through the first light-transmitting area.

2. The system for displaying images as claimed in claim 1, wherein the boundary extends from an interface between the sealant and the liquid crystal layer into a portion of the sealant and the liquid crystal layer, respectively.

3. The system for displaying images as claimed in claim 2, wherein a width of the boundary is 300 μm to 600 μm.

4. The system for displaying images as claimed in claim 1, wherein an area ratio of the first light-transmitting area to the boundary is 10% to 100%.

5. The system for displaying images as claimed in claim 1, wherein the first light-transmitting area is composed of at least one exposure opening, and the exposure opening has a shape comprising a circular shape, elliptic shape, polygonal shape or combinations thereof.

6. The system for displaying images as claimed in claim 1, wherein the circuit pattern comprises metal.

7. The system for displaying images as claimed in claim 1, wherein the sealant comprises a light and thermal cured sealant.

8. The system for displaying images as claimed in claim 1, further comprising:
   a pair of polarizers sandwiching the liquid crystal display panel; and
   a backlight device disposed under the pair of polarizers and the liquid crystal display panel, wherein the liquid crystal display panel, the polarizers and the backlight device construct a liquid crystal display.

9. The system for displaying images as claimed in claim 8, further comprising an electronic device, wherein the electronic device comprises:
   the liquid crystal display; and
   an input unit coupled to the liquid crystal display to provide input to the liquid crystal display such that the liquid crystal display displays images.

10. The system for displaying images as claimed in claim 9, wherein the electronic device is a mobile phone, digital camera, personal digital assistant (PDA), notebook computer, desktop computer, television, car display or portable DVD player.

11. A method for fabricating a system for displaying images, comprising:
   providing a first substrate and a second substrate, wherein the first substrate has a circuit pattern thereon;
   dispensing a sealant around and on the second substrate, thereby forming an enclosed region on the second substrate;
   dropping an amount of liquid crystal in the enclosed region on the second substrate, thereby allowing the liquid crystal to contact the sealant;
   assembling the first and second substrates, wherein the circuit pattern has at least one first light-transmitting area corresponding to a boundary between the sealant and the liquid crystal layer; and
   irradiating the first substrate with a light, wherein the light passes through the first substrate and then irradiates the sealant through the first light-transmitting area to cure the sealant, wherein the second substrate further comprises a light shielding layer thereon, the light shielding layer has at least one second light-transmitting area corresponding to the boundary, and an area ratio of the second light-transmitting area to the boundary is 0.1% to 10%, and the second light-transmitting area overlaps with the first light-transmitting area from a top view, so that the light illuminates outward through the second light-transmitting area while the light also irradiates through the first light-transmitting area.

12. The method for fabricating a system for displaying images as claimed in claim 11, wherein the boundary extends from an interface between the sealant and the liquid crystal layer into a portion of the sealant and the liquid crystal layer, respectively.

13. The method for fabricating a system for displaying images as claimed in claim 11, wherein a width of the boundary is 300 µm to 600 µm.

14. The method for fabricating a system for displaying images as claimed in claim 11, wherein an area ratio of the first light-transmitting area to the boundary is 10% to 100%.

15. The method for fabricating a system for displaying images as claimed in claim 11, wherein the first light-transmitting area is composed of at least one exposure opening, and the exposure opening has a shape comprising a circular shape, elliptic shape, polygonal shape or combinations thereof.

16. The method for fabricating a system for displaying images as claimed in claim 11, wherein the first and second substrates are assembled by a jig pressing process or hot pressing process.

17. The method for fabricating a system for displaying images as claimed in claim 11, further comprising:
   curing the sealant between the first and second substrates using a thermal curing process.

\* \* \* \* \*